J. VELK.
TAP AND DIE CHUCK.
APPLICATION FILED MAR. 9, 1918.
1,290,427.  Patented Jan. 7, 1919.
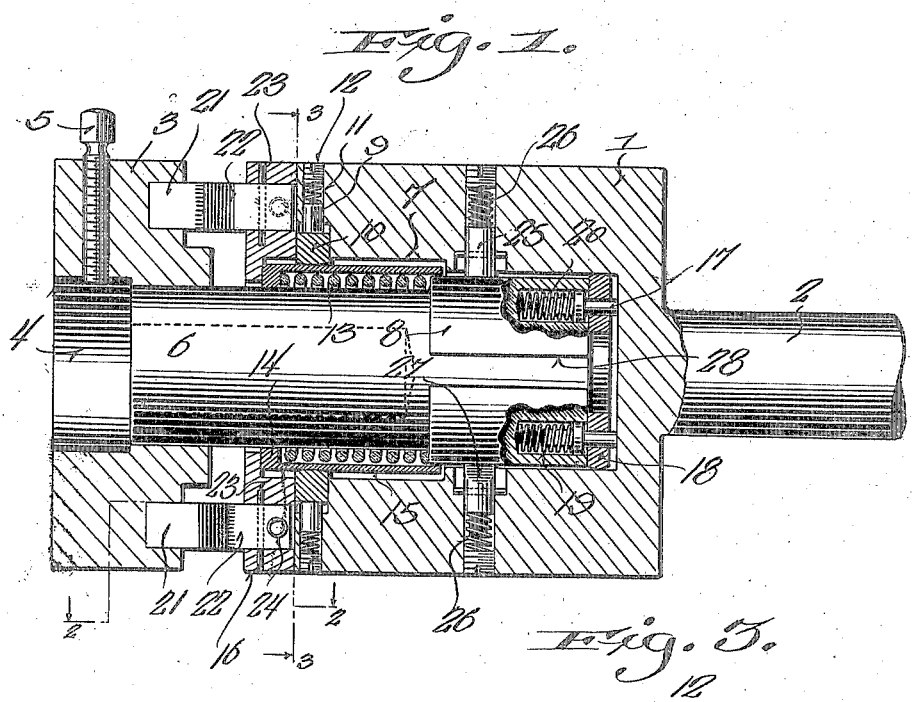
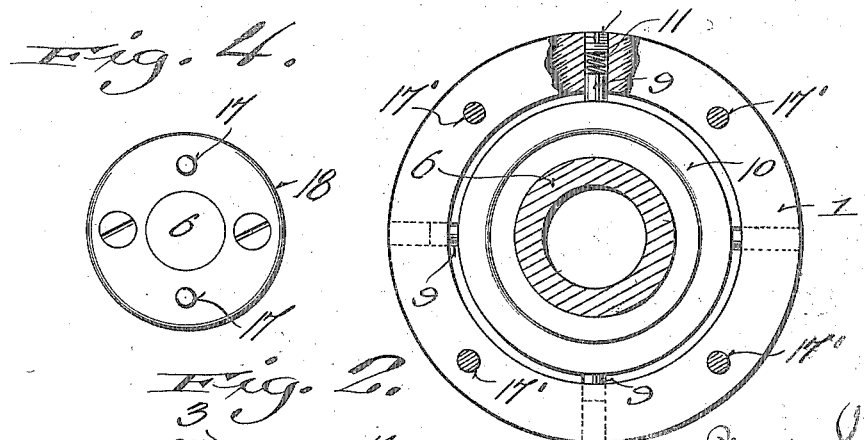
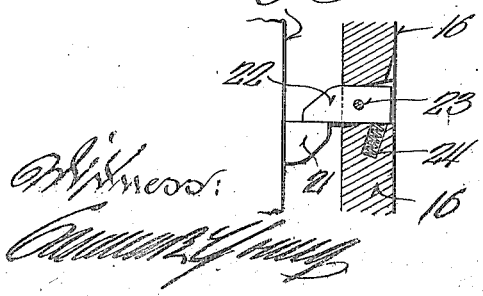

UNITED STATES PATENT OFFICE.

JOSEPH VELK, OF MILWAUKEE, WISCONSIN.

TAP AND DIE CHUCK.

1,290,427. Specification of Letters Patent. Patented Jan. 7, 1919.

Application filed March 9, 1918. Serial No. 221,503.

*To all whom it may concern:*

Be it known that I, JOSEPH VELK, a citizen of the United States, and resident of Milwaukee, in the county of Milwaukee and State of Wisconsin, have invented certain new and useful Improvements in Tap and Die Chucks; and I do hereby declare that the following is a full, clear, and exact description thereof.

My invention relates to screw threading machinery, and particularly improvements in die and tap holders therefor.

At the present time most devices of this character do not have means for cushioning the impact received by the tap or die when engaged by the work, nor with similar means for preventing the stripping of the threads when the stock is screwed out of the die or off of the tap. Similarly the majority of such devices at present in use have no means for automatically centering the tool with respect to the work as the latter engages the same. It is an aim of the present invention to incorporate in one chuck means for accomplishing all of these results.

It is also an object to provide a simply constructed and efficient means for holding the tap or die carrying part of the chuck relatively stationary both when the work is being threaded and when the latter is being removed from the tool.

With these and other particular objects in view the invention resides in the novel features of construction, combination and arrangement of parts which will be hereinafter more particularly described and claimed.

In the drawing:—

Figure 1 represents a vertical longitudinal sectional view through a chuck constructed in accordance with my invention.

Fig. 2 is a detail sectional view taken substantially on the plane of the line 2—2 of Fig. 1.

Fig. 3 is a transverse sectional view on the plane of the line 3—3 of Fig. 1, and Fig. 4 is a detail end view of the die carrying portion of the invention.

The invention consists essentially of two main parts, a main supporting head 1 having a spindle 2 extending from one end whereby the device may be mounted upon a suitable lathe or other screw threading machine, and a die or tap carrier 3 having a central circular cavity 4 in which a tool is clamped by a set screw 5 and a laterally extending tubular or socketed shank 6, the opening in which communicates with the bottom of the cavity 4. The shank 6 is partially disposed within a socket 7 formed in the head 1.

From Fig. 1 it will be noted that the socket 7 is of greater diameter than the cylindrical shank 6 although the latter has the inner end cylindrically enlarged as at 8. This difference in diameters between the socket 7 and the shank of the tool carrier permits the latter to automatically adjust itself to the work which is being threaded if the latter happens to be slightly out of alinement with the axis of the die. The shank 6, however, is normally retained centrally of the socket 7 by means of a plurality of inwardly urged pins 9, the inner ends of which engage the outer periphery of a ring 10 which surrounds the smaller portion of the shank. Said pins 9 are actuated by expansion coil springs 11 that are disposed in openings drilled through the wall of the head 1, the outer ends of said openings being closed by screw plugs 12, said plugs also being adapted to vary the tension of said springs.

Inasmuch as the carrier is adapted to move outwardly under certain conditions, although normally retained in the position shown in Fig. 1, a helical expansion spring 13 is disposed around the smaller portion of the shank 6 and has one end engaged with the shoulder formed by the enlargement 8. The other end of this spring is in contact with an inwardly extending annular flange 14 of a spring housing 15 which completely incloses said spring. This housing and the spring 13 is retained in the socket 7 in the head 1 by means of a retaining plate 16 which is secured to one end of said head by screws or the like 17'. This plate 16 has a central opening sufficiently large to receive the reduced portion of the shank 6 and to permit considerable transverse movement thereof. The hereinbefore mentioned ring 10 surrounds and engages the spring housing 15.

Also inclosed within the socket of the head 1 is a means for cushioning the inward thrust of the shank 6, said means being located in the inner end thereof. This means includes a plurality of headed pins 17, the shanks of which extend through openings in a plate 18, secured to the inner end of the shank 6, and into engagement with the inner end of the socket 7, while their heads are slidably positioned in sockets 19 drilled in said end of said shank 6. Expansion helical springs 20 engage the inner ends of the sockets 19 and the heads of the pins 17 to force the latter outwardly.

The tool carrier is held against rotation in a clockwise direction by means of engaging fingers 21 and 22, the fingers 21 being relatively stationary and projecting from the inner face of the plate 3 of said carrier; the fingers 22 are pivoted as at 23 in the apertures formed in the retaining plate 16. Cushioning springs 24 in sockets threaded in said plate 16 urge the pivoted fingers 22 in one direction as shown in Fig. 2.

Rotation of the carrier in a counter-clockwise direction is limited by spring pressed detents 25 which are urged inwardly into engagement with the enlarged portion 8 of the shank 8 by expansion springs 26. These springs and the detents 25 are mounted in the head 1 and adjusted in the same manner as the pins 9. It will be seen from Fig. 1 that one side of the inner end of each detent 25 is beveled off as at 27 to permit the same to ride out of the key-ways 28 cut in the enlarged portion 8 of the shank 6 when said carrier is rotated in a clockwise direction. Each of the fingers 21 and 22 also has one beveled face whereby they may move past each other when the carrier is rotated in a counter-clockwise direction.

In operation the head 1 of the chuck is held stationary in a suitable part of a screw threading machine and a die or tap is disposed in the cavity 4 of the plate 3 of the carrier. The screw or other object to be threaded is then fed toward the relatively stationary tool while rotating at appropriate speed until the latter is engaged, whereupon continued rotation of the work will feed the tool thereinto or therearound depending upon the character of said tool. The jar which results from the engagement between the work and the tool is taken up by the cushioning springs 20 which retard the inward movement of the shank 6 as is obvious. If the fingers 21 and 22 engage as shown in Figs. 1 and 2 the work will be threaded by the tool without rotation of the carrier, but if said fingers do not engage, the carrier will be rotated until such contact is procured. The impact resulting from the forcible engagement between these fingers is lessened by the springs 24 which move the fingers 22 as hereinbefore explained.

Should the screw or other work be slightly out of alinement with the axis of the tool, this axis is varied slightly upon contact of the work and tool due to the play between the shank 6 and the head 1. When the work is removed from the tool, the shank and consequently the tool will be returned to its normal position.

When the work is removed from the tool it is obviously rotated in a reverse or counter-clockwise direction. The carrier is held against excessive movement in this direction so that the separation between the work and tool may be readily accomplished, by the engagement of the detents 25 in the key-ways 28. Under certain conditions the work may be withdrawn too rapidly so that the threads are liable to be injured, therefore the carrier is permitted to move outwardly against the tension of the spring 13, the detents 25 sliding in the key-ways 28. Stripping or mutilation of the threads is thus prevented.

A chuck embodying all of the advantageous features hereinbefore particularly set forth will be a material advantage over any chuck used for similar purposes which is at present on the market. The work may thus be much more expediently and efficiently accomplished and without danger of mutilation. The several cushioning features of the invention eliminate wear and tear, not only on the chuck, but also on the other parts of the screw threading machinery.

I claim:—

1. A device of the class described comprising a tubular head, a tool carrier adapted to receive a tool and including a shank secured in said head, the shank being independently transversely movable therein, said carrier having limited longitudinal shifting movement with respect to said head, a cushioning means in said head to limit longitudinal shifting of the shank, and additional means for cushioning the transverse movement of the shank.

2. A device of the class described comprising a tubular head, a tool carrier adapted to receive a tool and including a shank secured in said head, the shank being independently transversely movable therein, said carrier having limited longitudinal shifting movement with respect to said head, a cushioning means engaging the inner end of the shank to limit inward movement thereof, means for cushioning the outward movement of the shank, and additional means for cushioning the transverse movement of the shank.

3. A device of the class described comprising a tubular head, a tool carrier adapted to receive a tool and including a shank disposed in said tubular head and movable transversely therein, a band surrounding said shank, and spring means engaged with the band for normally retaining the same and the shank centrally of the head.

4. A device of the class described comprising a tubular head, a tool carrier adapted to receive a tool and including a shank disposed in said tubular head and movable transversely therein, said carrier being also shiftable longitudinally with respect to the head, a coil spring surrounding said shank within the head to limit outward movement of the carrier, a band disposed within the head and surrounding the shank and said coil spring, and spring means engaged with the band for normally retaining the same and the shank centrally of the head.

5. A device of the class described comprising a tubular head, a tool carrier adapted to receive a tool and including a shank disposed in said head and movable transversely therein, the inner end of said shank being shouldered, said carrier having limited longitudinal movement with respect to said head, a coil spring surrounding said shank and having one end engaged with said shoulder, a spring housing surrounding said coil spring within the head and having the other end engaged therewith, said housing being movable transversely with the shank and held against longitudinal movement, and means engaged with said spring housing for normally retaining the same and the shank centrally of the head and for cushioning the transverse movement thereof.

6. A device of the class described comprising a tubular head, a tool carrier including a shank disposed in said tubular head and longitudinally shiftable therein, the inner end of said shank having a socket, a plate secured to the inner end of said shank over said socket, a headed plunger slidable in said socket, the pin of said plunger being movable through an opening in said plate whereby to engage the inner end of the tubular head, the inner end of said shank and its plate, and the plunger movable therethrough being housed within said tubular head, and a spring for urging said headed plunger out of its socket and cushioning the inward movement thereof.

7. A device of the class described comprising a tubular head, a tool carrier including a tool carrying head, a shank extending from said tool carrying head and disposed in said tubular head, said tool carrier being longitudinally shiftable with respect to the tubular head, means for cushioning the outward movement of the tool carrier, a finger extending inwardly from the tool carrying head, a second finger extending outwardly from the tubular head and pivoted thereto, said fingers being engaged when the tool carrier is rotated with respect to the tubular head, the last mentioned finger having a limited movement in the direction of rotation of the tool carrier, and means for cushioning the movement of said last mentioned finger.

In testimony that I claim the foregoing I have hereunto set my hand at Milwaukee, in the county of Milwaukee, and State of Wisconsin.

JOSEPH VELK.